United States Patent
Tezuka et al.

(10) Patent No.: US 6,568,497 B1
(45) Date of Patent: May 27, 2003

(54) PROTECTIVE STRUCTURE FOR AXLE JOINTS

(75) Inventors: Hiroyuki Tezuka, Kakogawa (JP); Sosuke Kinouchi, Kakogawa (JP); Fumio Mizuta, Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 09/612,311

(22) Filed: Jul. 7, 2000

(30) Foreign Application Priority Data

Feb. 25, 2000 (JP) ........................................ 2000-049279

(51) Int. Cl.⁷ .............................. B62D 7/18; B62J 15/00
(52) U.S. Cl. ................................. 180/346; 280/93.512
(58) Field of Search ................................. 180/346, 348, 180/358, 257; 280/93.512, 124.125, 93.504; 301/137

(56) References Cited

U.S. PATENT DOCUMENTS

| 2,631,865 | A | * | 3/1953 | Hoffman ................ 280/93.512 |
| 2,775,307 | A | * | 12/1956 | Hill ............................ 280/257 |
| 3,157,395 | A | * | 11/1964 | Budzynski et al. ......... 267/227 |
| 3,428,140 | A | * | 2/1969 | Tolan, Jr. .................... 180/256 |
| 4,664,208 | A | * | 5/1987 | Horiuchi et al. .............. 180/23 |
| 4,722,415 | A | * | 2/1988 | Takahashi ................... 180/257 |
| 4,801,178 | A | * | 1/1989 | Sasa ............................ 301/137 |
| 6,099,003 | A | * | 8/2000 | Olszewski et al. ...... 280/93.512 |
| 6,179,308 | B1 | * | 1/2001 | Mielauskas et al. ... 280/93.512 |

FOREIGN PATENT DOCUMENTS

| JP | 59-109574 | 7/1984 |
| JP | 6-171545 | 6/1994 |
| JP | 10-16850 A | 1/1998 |

* cited by examiner

Primary Examiner—Paul N. Dickson
Assistant Examiner—David R. Dunn
(74) Attorney, Agent, or Firm—Oliff & Berridge, PLC

(57) ABSTRACT

In a protective structure for a joint portion of an axle according to the present invention, a knuckle member 24 is provided with a covering portion 28 surrounding a joint portion 23 in the circumferential direction of a constant velocity joint shaft 22, and the joint portion 23 is accommodated in an inner space of the covering portion 28. The knuckle member 24 having a driven shaft support portion 33, a strut support portion 35 and covering portion the is molded out 28 an aluminum alloy into an integral part. According to the present invention, the joint portion is protected reliably by the covering portion, and, a reduction of the weight of the protective structure and simplification of a working process for the production thereof can be attained.

8 Claims, 5 Drawing Sheets

PROTECTIVE STRUCTURE FOR AXLE JOINTS

BACKGROUND OF THE INVENTION

1. Field of the Invention

This invention relates to a protective structure for protecting a joint portion, especially a boot fitted around the joint portion, of a joint shaft employed in an axle of, for example, a four wheel vehicle.

2. Description of the Related Art

FIG. 5 is a partially sectioned front elevation taken from a front side of a body, showing a principal portion of a front axle of a straddle riding type four-wheel all-terrain vehicle. In general, a front axle of a four-wheel vehicle is connected to a steering system, and the same applies to that of a four-wheel drive vehicle. The front axle employs a constant velocity joint shaft 1. The constant velocity joint shaft 1 has a main shaft 2 and a driven shaft 3, which are connected together via a joint portion (constant velocity joint) 4. The driven shaft 3 is mounted with a hub 5, to which a disc wheel (not shown) of a wheel is to be attached. A reference numeral 6 in FIG. 5 denotes a cap covering a hub nut by which the hub 5 is fixed.

In a structure of the axle shown in FIG. 5, the constant velocity joint shaft 1 is supported on a knuckle arm 7. A lower end portion of the knuckle arm 7 is connected to a lower arm (which is called a "suspension arm" as well) 9 via a specific connecting structure 8. A strut (not shown) is fixed to an upper end portion of the knuckle arm 7. A reference numeral 10 in FIG. 5 denotes an axis of the strut to be fixed to the knuckle arm.

The constant velocity joint shaft 1 is provided thereon with a rubber covering portion 11 for protecting the joint portion 4. This covering member 11 is generally called a boot. The boot 11 is exposed to the outside, and struck in some cases by a small stone during the travel of a vehicle. In view of the matter, a protective plate 12 (shown by two-dot chain lines) for protecting the boot 11 is provided in many cases. This protective plate 12 is formed by a bent flat plate, for example, and fixed to the lower arm 9.

The related art structures showing a front portion of a body of the vehicle including a front axle are disclosed in Japanese Patent Laid-Open No. 16850/1998.

However, a protective structure formed of such a protective plate 12 has the following problems.

The lower arm 9 is usually provided on the front portion of the constant velocity joint shaft 1, i.e., on the near side of the surface of FIG. 5. The lower arm 9 is positioned lower than the constant velocity joint shaft 1 as shown in FIG. 5.

Therefore, in a protective structure in which the protective plate 12 is fixed to the lower arm 9, a distance between the protective plate 12 and joint portion 4, or a distance between the protective plate 12 and boot 11 becomes large. In addition, since the protective plate 12 has a flat plate-like shape, the boot 11 is only partially covered therewith.

Under the circumstances, the joint portion 4 and boot 11 cannot be covered satisfactorily in some cases.

In view of the designing of a suspension system, it is difficult to provide the lower arm 9 in a position close to the constant velocity joint shaft 1. Consequently, it is difficult to provide the protective plate 12 close to the constant velocity joint shaft 1 for protecting the joint portion 4 and boot 11.

Since the knuckle arm 7 required to have a certain level of rigidity, it is usually manufactured out of cast iron, and a thickness thereof is designed to a level not lower than a certain level. Due to such a heavy knuckle arm 7, the weight of a vehicle as a whole increases, and, especially, the weight under the strut, which influences the traveling performance of a vehicle, is heavy.

SUMMARY OF THE INVENTION

The present invention has been made in view of the above circumstances, and provides a protective structure for a joint portion of an axle, capable of protecting the joint portion effectively. Further the present invention provides a protective structure for a joint portion of an axle, capable of contributing to the reduction of the weight of a knuckle member.

According to an aspect of the present invention, the protective structure for a joint portion of an axle of the four wheel vehicle is adapted to protect a joint portion of a joint shaft constituting the axle and being supported on a knuckle arm forming a suspension system. The knuckle member is provided with a covering portion surrounding the joint portion in the circumferential direction of the joint shaft, the joint portion being accommodated in interior space of the covering portion. According to this structure, the joint portion is surrounded by the covering portion, so that the joint portion can be protected reliably.

In this protective structure for a joint portion of an axle, the covering portion may be molded out of an aluminum alloy into an integral body with a member for supporting a driven shaft of the joint shaft and a member for supporting a strut, to form the knuckle member. With this structure, the rigidity of the knuckle member as a whole can be structurally improved. Therefore, even when the knuckle member is made of an aluminum alloy with a reduced thickness, a required level of rigidity can be secured, so that the weight of the knuckle member can be reduced. Moreover, a manufacturing process can be simplified owing to the molding method for obtaining an integral covering member.

These objectives as well as other features and advantages of the present invention will become more apparent to those skilled in the art from the following description with reference to the accompanying drawings.

BRIEF DESCRIPTION OF THE DRAWINGS

A preferred embodiment of the present invention will now be described in detail on the basis of the following Figures, wherein:

FIG. 1 illustrates a straddle type four-wheel all-terrain vehicle, wherein FIG. 1A is a front view, and FIG. 1B is a side view;

DESCRIPTION OF THE PREFERRED EMBODIMENT

An embodiment of the present invention will now be described.

Figure 1:
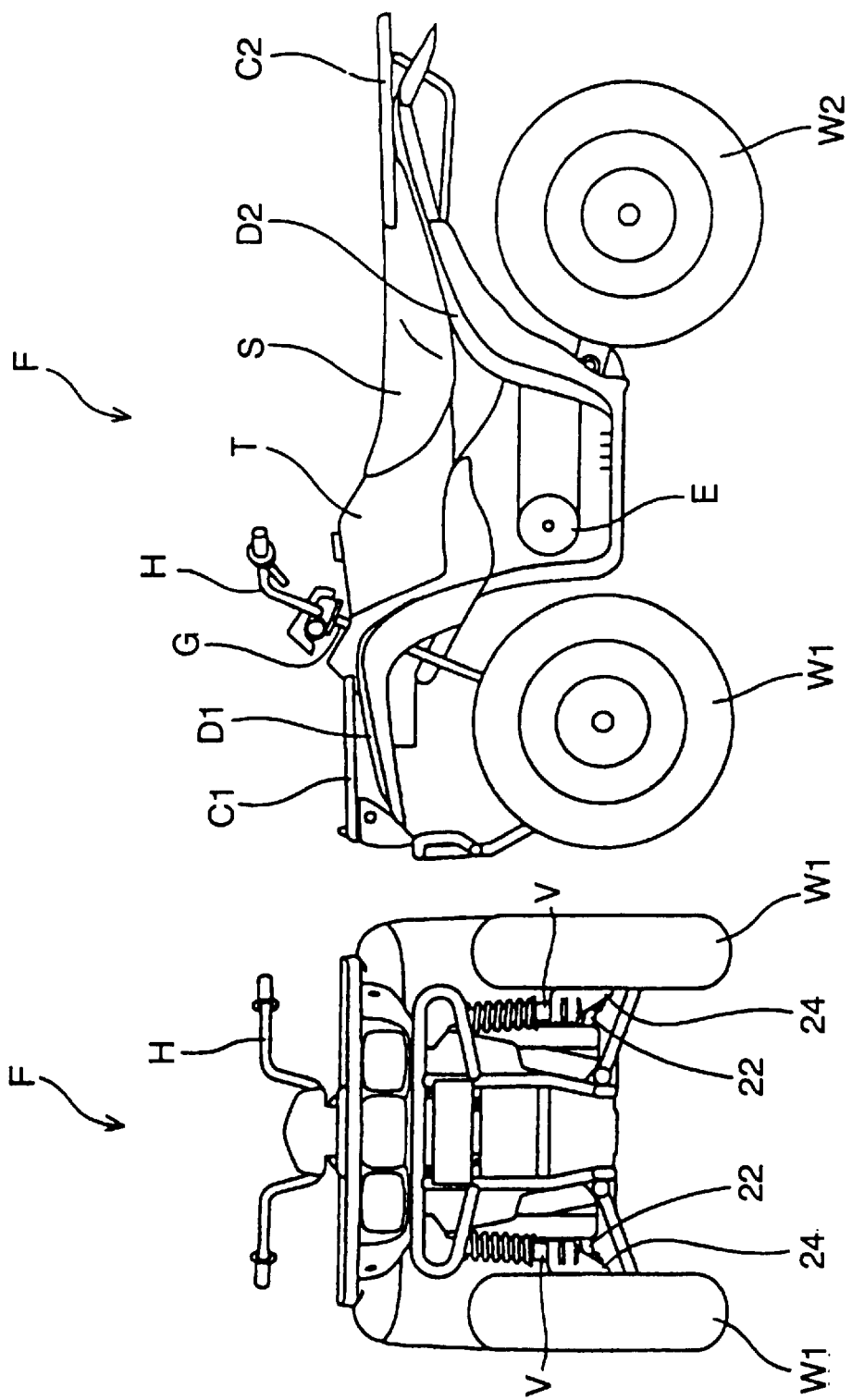

FIG. 1 illustrates a straddle type all-terrain vehicle F (which will hereinafter be referred to simply as a "vehicle F") employing the protective structure for a joint portion of an axle of the embodiment of the present invention, wherein FIG. 1A is a front view, and FIG. 1B is a side view.

The vehicle F can travel on the sand, a bumpy road, a rocky mountain, or unleveled ground having small pools of muddy water. The vehicle F of FIG. 1 is a four-wheel drive vehicle. A driving system, such as an engine E, front wheels W1, rear wheels W2, a fuel tank T and a seat S are fixed to or mounted on a body frame of the vehicle F. The front wheels W1 are covered with front fenders D1, and the rear wheels W2 are covered with rear fenders D2. Carriers C1, C2 are provided above the fenders D1, D2 for the purpose of loading goods thereon.

The body frame of the vehicle F is provided with a steering shaft G so that the steering shaft can be turned. When a driver turns the steering shaft G by operating handlebars H fixed to an upper end portion of the steering shaft G, the direction of the knuckle members 24 is changed, and the direction of the front wheels W1 fixed rotatably to the knuckle members is changed. Thus, the driver can steer the vehicle F.

An axle for the front wheels W1, i.e. a front axle, is formed of joint shafts 22. Each joint shaft 22 is a constant velocity joint shaft. The constant velocity joint shafts 22 are supported on the body frame via a suspension system. The suspension system of the vehicle F is of a so-called McPherson strut type. This suspension system includes the knuckle members 24 supporting constant velocity joint shafts 22, lower arms connected to the knuckle members 24, and struts V connected to upper end portions of the knuckle members 24. The knuckle members 24 have covers, by which joint portions of the constant velocity joint shafts 22 are protected.

Figure 2:
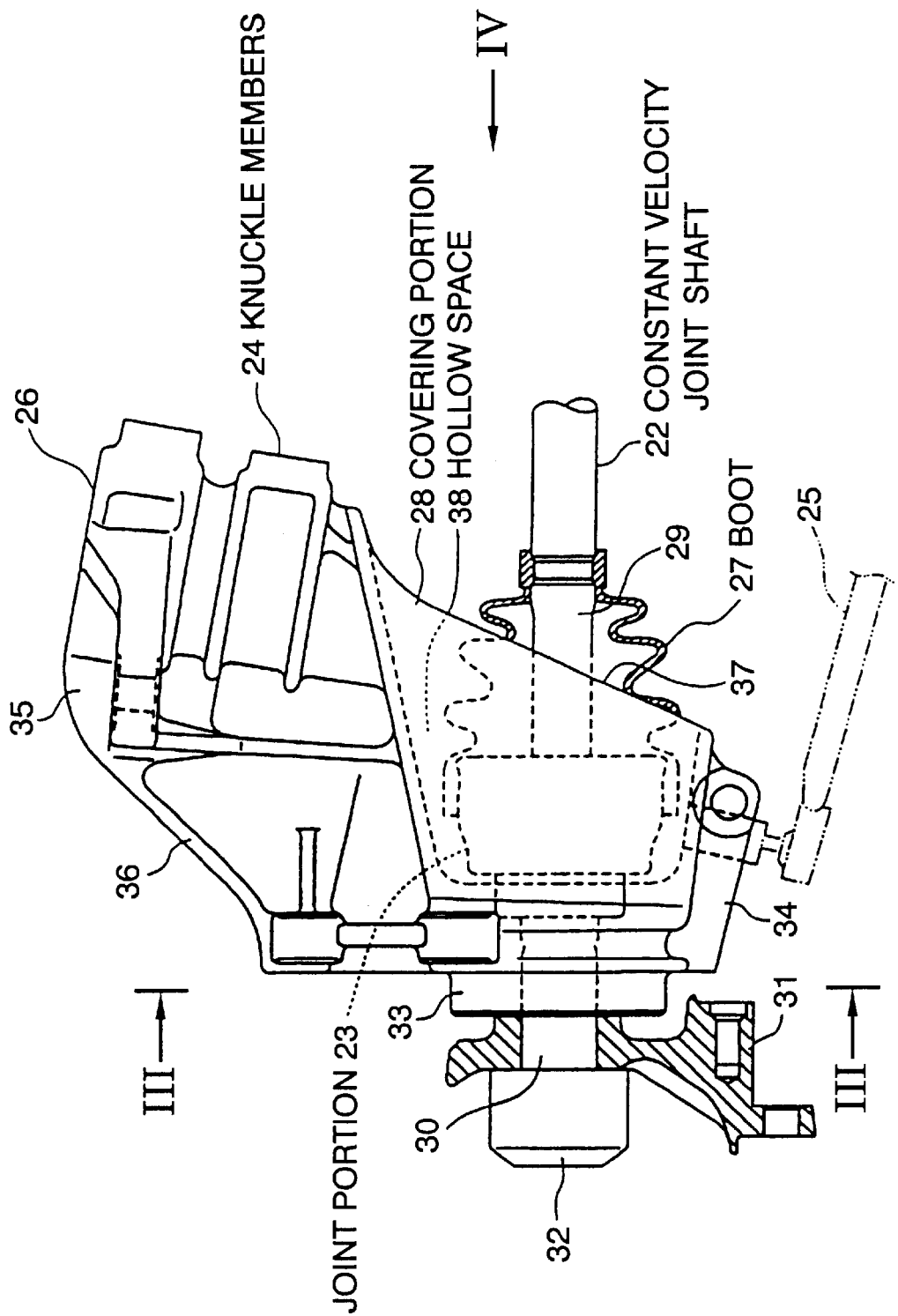
FIG. 2 is a front view taken from a front side of a body of the vehicle of FIG. 1, showing a constant velocity joint shaft, a knuckle member and surrounding members thereof in a right front wheel of the vehicle.

FIG. 2 is a front view showing the constant velocity joint shaft 22, the knuckle member 24 and surrounding members relative to the right front wheel W1 of the vehicle F, and taken from a front side of the body of the vehicle F.

Figure 3:
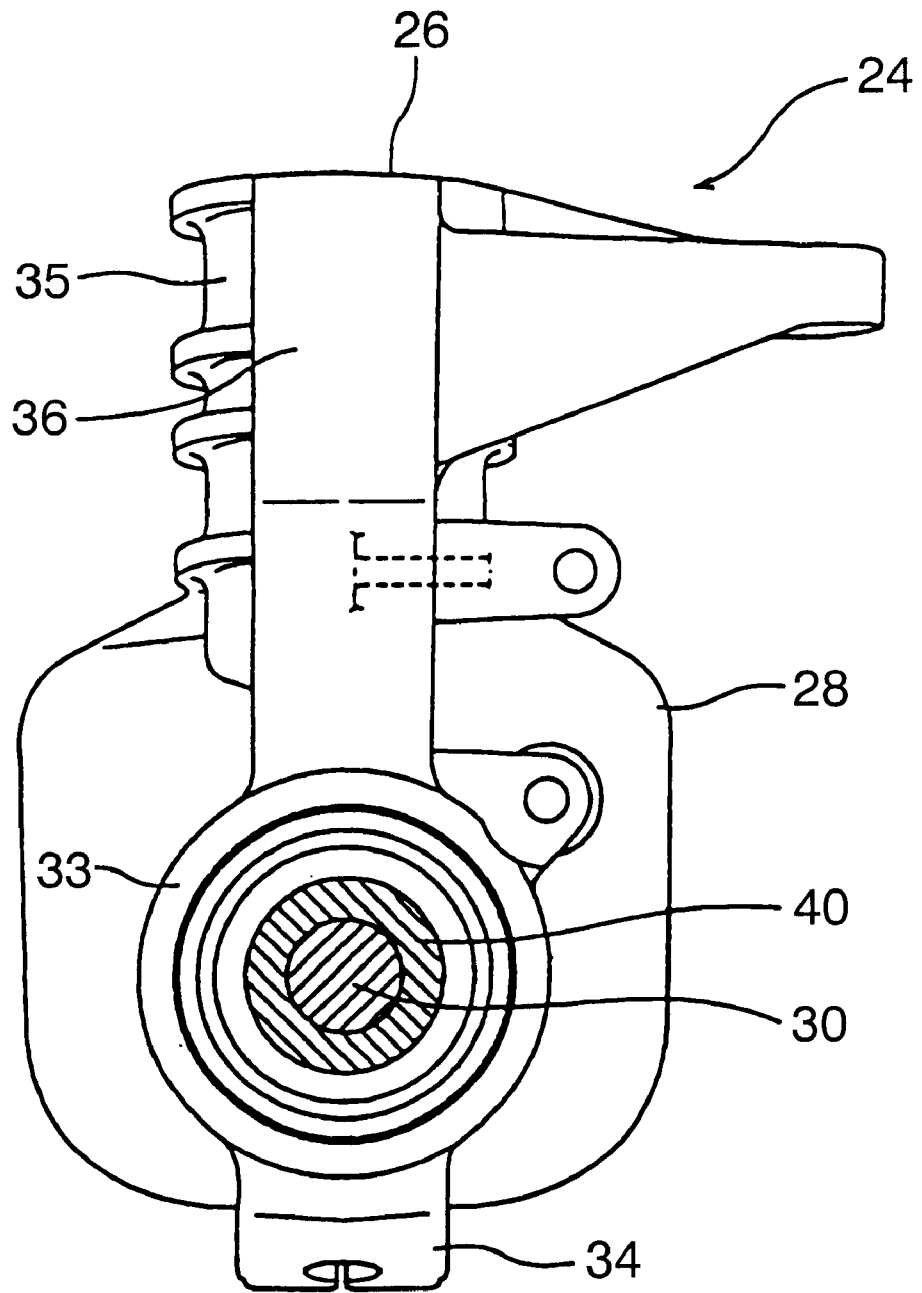
FIG. 3 is a sectional view taken along the arrow-designated line III—III in FIG. 2.

FIG. 3 is a sectional view taken along the arrow-designated line III—III in FIG. 2.

Figure 4:
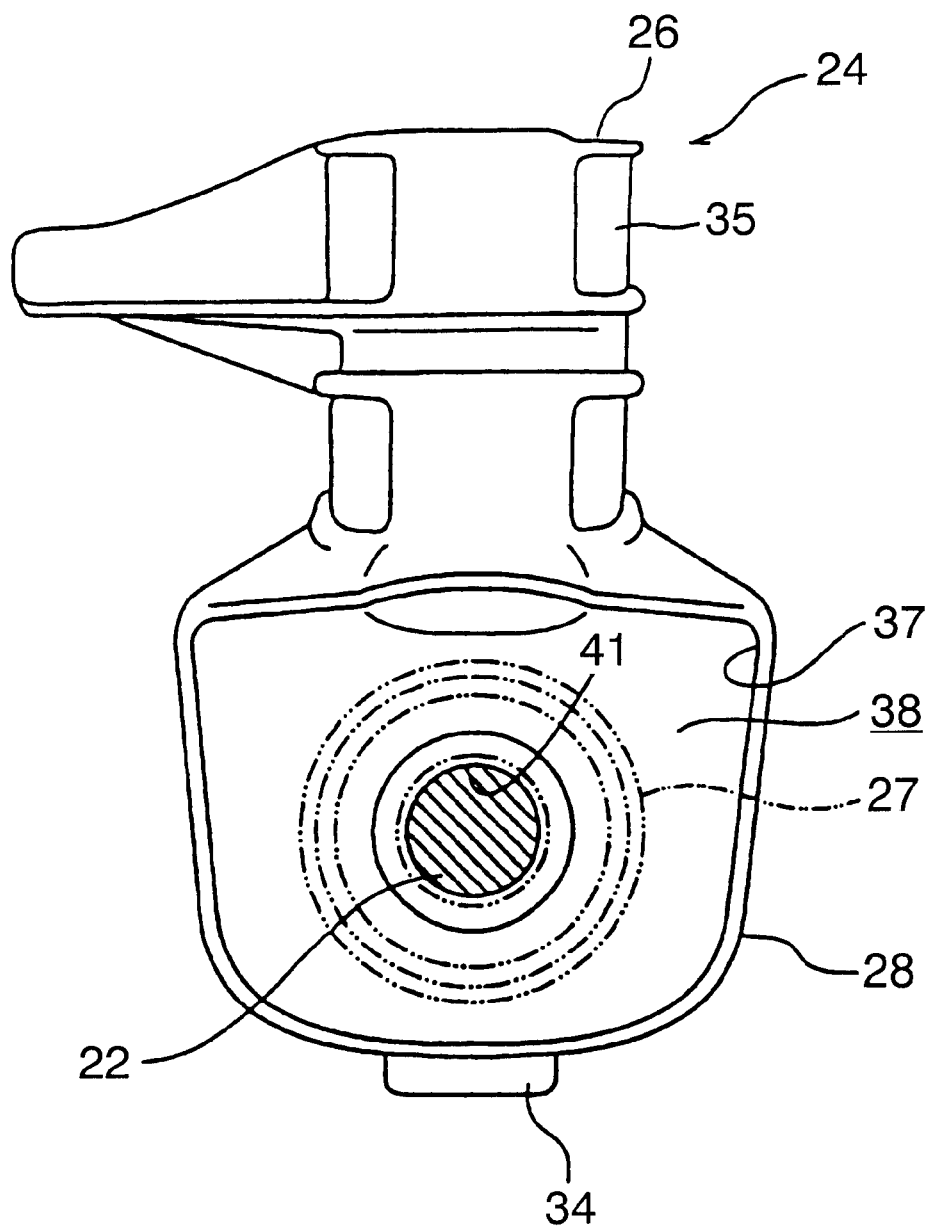
FIG. 4 is an elevation taken in the direction of an arrow IV in FIG. 2.

FIG. 4 is an elevation taken in the direction of an arrow IV in FIG. 2.

Referring to these drawings, the shapes and arrangement of the constant velocity joint shaft 22, knuckle member 24 and surrounding members will be described.

As mentioned above, the constant velocity joint shaft 22 is supported on the knuckle member 24. To describe the parts in more detail, the constant velocity joint shaft 22 has a main shaft 29, a driven shaft 30, and a joint portion 23 interposed between the main shaft 29 and the driven shaft 30. The main shaft 29 is connected to a driving shaft connected to a differential apparatus (not shown) of the vehicle F. The driven shaft 30 is connected to the main shaft 29 via the joint portion 23 (constant velocity joint) so as to project sideways from the body. This driven shaft 30 is fitted rotatably in a driven shaft support portion 33 of the knuckle member 24 via a bearing 40.

The reasons why the constant velocity joint shaft 22 is employed as the front axle of the vehicle F are as follows. Namely, since the driven shaft of the front axle is connected to a steering system for maneuvering the front wheel W1, an angle of the driven shaft with respect to the main shaft is changed by a steering operation. In the case when the vehicle F is a four-wheel drive vehicle, the front wheel W1 also works as a driving wheel. Therefore, it is desirable to prevent a phase difference in an angle of rotation from occurring between the main and driven shafts. The constant velocity joint shaft 22 can transmit an angle of rotation of the main shaft 29 to the driven shaft 30 without a phase difference by the joint portion 23 (constant velocity joint) interposed between the two shafts (main shaft 29 and driven shaft 30) even when an angle made between these two shafts 29 and 30 reaches an arbitrary level. Therefore, the constant velocity joint shaft 22 is desirable as the front axle of the vehicle F.

The front wheel W1 is fixed to the driven shaft 30. To be exact, a hub 31 is mounted fixedly on the driven shaft 30, and a disc wheel (not shown) of the front wheel W1 is fixed to the hub 31. A cap 32 covering a hub nut for fixing the hub 31 is fixed to the hub 31.

A rubber boot 27 is provided on the joint portion 23 of the constant velocity joint shaft 22, whereby the joint portion 23 is protected from mud and dust.

The knuckle member 24 supports the constant velocity joint shaft 22, and constitutes a part of the suspension system as mentioned above. The knuckle member 24 has at least a portion for supporting the driven shaft 30 of the constant velocity joint shaft, and a portion for supporting the strut. In this embodiment, the knuckle member 24 of the vehicle F is provided with a portion 33 for supporting the driven shaft 30 of the constant velocity joint shaft 22, a portion 34 for connecting the lower arm 25, a portion 35 for supporting the strut, and a covering portion 28 for protecting the joint portion 23 of the constant velocity joint shaft 22. The driven shaft support portion 33, the lower arm connecting portion 34, the strut support portion 35 and the covering portion 28 are molded together out of an aluminum alloy into an integral body. Namely, the knuckle member 24 of the vehicle F is formed as a single aluminum alloy part. The covering portion 28 is a structurally strong cylindrical member. The strut support portion 35 is formed above and continuously from the covering portion 28, the driven shaft support portion 33 is formed on one side of and continuously from the covering portion 28, and the lower arm connecting portion 34 is formed below and continuously from the covering portion 28. Namely, the strut support portion 35 and the driven shaft support portion 33 are connected together via the cylindrical covering portion 28. The driven shaft support portion 33 and the lower arm connecting portion 34 are connected together via the cylindrical covering portion 28. Owing to such an integral molded structure, the knuckle member 24 becomes structurally strong. Therefore, a required level of rigidity can be secured even when the thickness of the knuckle member 24 is set thin, and, even when the material thereof is an aluminum alloy. Owing to the use of a lightweight material (i.e., an aluminum alloy) and the capability of setting thin the thickness of the knuckle member 24, the reduction of the weight of the knuckle member 24 can be achieved on a large scale.

The driven shaft support portion 33 has a circular central hole, and supports the driven shaft 30 via a bearing 40 (refer to FIG. 3). The bearing 40 is fitted in the central hole of the driven shaft support portion 33.

The lower arm connecting portion 34 is provided in a position lower than the driven shaft support portion 33, and supports a lower end portion of the lower arm 25.

The strut support portion 35 is provided in a position higher than the driven shaft support portion 33, and supports a lower end portion of the strut. The strut support portion 35 has a generally cylindrical shape. The strut is supported on the strut support portion 35 with a lower end inserted in the interior of the strut support portion 35.

Between the driven shaft support portion 33 and the strut support portion 35, a rib 36 is formed so as to improve the rigidity of the knuckle member 24 as a whole.

The covering portion 28 is formed on the side part of the driven support portion 33 which is on the side of the center of the body (center side of the lateral direction of the vehicle F), and in a position between the strut support portion 35 and the lower arm connecting portion 34. The covering portion 28 has an opening 37 at one side portion thereof (on the side of the center of the body), and a through hole 41 (refer to FIG. 4) at the other side portion thereof (on the outer side of the vehicle F), and has a generally cylindrical (or a so-called funnel-shaped) structure. The opening 37 of the covering portion 28 is opened greatly so that a whole end surface of the covering portion 28 is opened. The through hole 41 of the covering portion 28 communicates with and continues to the central hole of the driven shaft support portion 33.

The covering portion 28 externally has an approximately frusto-pyramidal shape. The portions of the frusto-pyramidal body which correspond to ridges thereof are rounded. A hollow space 38 is formed on the inner side of the covering portion 28, and the joint portion 23 of the constant velocity joint shaft 22 is accommodated in the hollow space 38.

In order to fix the constant velocity joint shaft 22 to the knuckle member 24, the driven shaft 30 of the constant velocity joint shaft 22 is inserted from the opening 37 so that the driven shaft 30 passes through the through hole 41 and the central hole of the driven shaft support portion 33. When the constant velocity joint shaft 22 is fixed to the knuckle member 24, the joint portion 23 of the constant velocity joint shaft 22 is accommodated in the hollow space 38 on the inner side of the covering portion 28 of the knuckle member 24.

Namely, when the constant velocity joint shaft 22 is supported on the knuckle member 24, the joint portion 23 is surrounded by the covering portion 28. This enables the joint portion 23 to be protected reliably by the covering portion 28. For example, even when a small stone on a road surface is sprung up by the front wheel W1 while the vehicle F travels, the covering portion 28 can spring back the small stone, and prevent the small stone from striking on the joint portion 23.

The covering portion 28 is formed with the driven shaft support portion 33 and the strut support portion 35 into an integral structure, and constitutes the knuckle member 24 with these parts (driven shaft support portion 33 and strut support portion 35).

The knuckle member can also be formed by fixing a separately formed covering portion 28 to a member having the driven shaft support portion 33, the strut support portion 35, and the covering portion 28 formed separately. However, the knuckle member 24 having the covering portion 28, the driven shaft support portion 33 and the strut support portion 35 together in an integral structure enables the rigidity of the knuckle member 24 as a whole to be improved more than the knuckle member 24 formed by combining the plural members with one another in the above mentioned manner, and the former also enables a manufacturing process to be simplified more than the latter.

The embodiment of the protective structure for a joint portion of an axle joint according to the present invention has been described with reference to FIGS. 1–4.

The knuckle member 24 can also be formed to a shape other than that described in this embodiment. The positional relation between the driven shaft support portion 33, lower arm connecting portion 34 and covering portion 28 may be determined suitably in accordance with, for example, a suspension system.

In the above embodiment, the covering portion 28 is employed for protecting the joint portion 23 but the shape of the covering portion 28 is not limited to the cylindrical shape. The covering portion 28 may be formed to some other shape as long as the cover can surround the joint portion 23.

Figure 5:
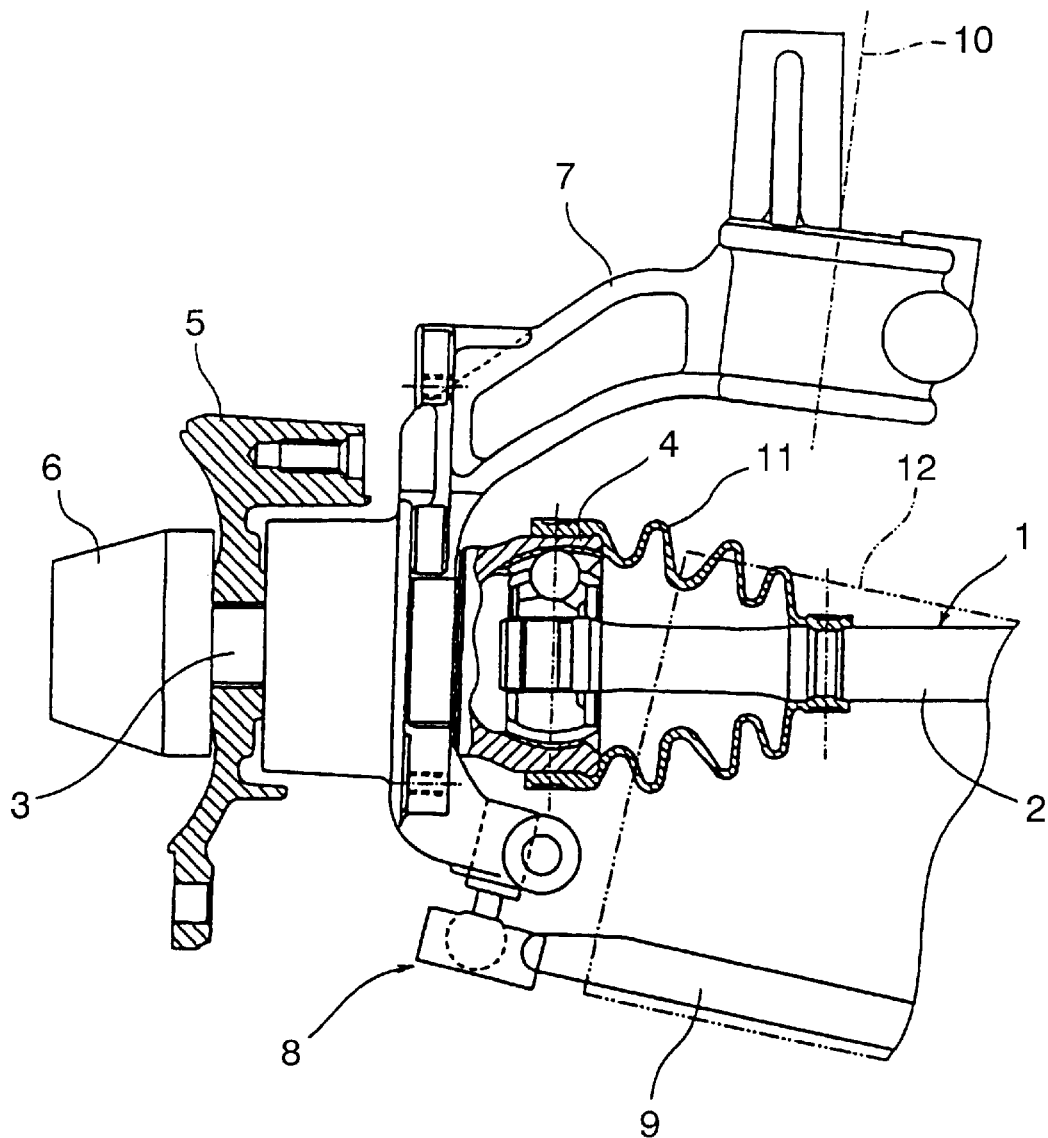
FIG. 5 is a partially sectioned front view showing a principal portion of a front axle of a four-wheel drive vehicle of the related art and taken from a front side of a body of the vehicle.

In the embodiment, the conventional protective plate (designated by a reference numeral 12 in FIG. 5) is not employed. But if necessary, the protective plate may be employed with the knuckle member having the covering portion of the embodiment.

In the embodiment, the driven shaft support portion 33, the strut support portion 35 and the covering portion 28 are molded together out of a aluminum alloy into an integral body. These parts may be formed separately, and not molded into an integral body, and then fixed or fastened to one another by a known fixing device or a known fastening device to form a knuckle member.

In the embodiment, the protective structure for a joint portion of an axle is applied to the joint portion of the axle of the front wheel W1 of the vehicle F. When an axle of a rear wheel is formed of a joint shaft, the protective structure for a joint portion of an axle according to the present invention can also be applied to the joint portion of the axle of the rear axle.

In the embodiment, the protective structure for a joint portion of an axle according to the present invention is applied to the joint portion of the constant velocity joint shaft. The protective structure for a joint portion of an axle according to the present invention, however, can be applied not only to a constant velocity joint shaft but also to all kinds of joint shafts which can constitute an axle.

Numerous modifications and alternative embodiments of the present invention will be apparent to those skilled in the art in view of the foregoing description. Accordingly, this description is to be construed as illustrative only, and is provided for the purpose of teaching those skilled in the art the best mode carrying out the invention. The detail of the structure and/or function may be varied substantially without departing from the spirit of the invention and all modification which come within the scope of the appended claims are reserved.

What is claimed is:

1. A protective structure for a joint portion of a joint shaft that is part of an axle of a vehicle, comprising:
   a knuckle member that is part of a suspension system of the vehicle; and
   a covering portion provided on the knuckle member surrounding the joint portion in a circumferential direction of the joint shaft, the covering portion being rigidly fixed with the knuckle member and extending away from a main body of the knuckle member, wherein the knuckle member comprises a portion that supports a driven shaft of the joint shaft and a portion that supports a strut, and the knuckle member includes a rib provided between the driven shaft support portion and the strut support portion.

2. A protective structure for a joint portion of a joint shaft that is part of an axle according to claim 1, wherein:
   the knuckle member and the covering portion are molded into an integral part.

3. A protective structure for a joint portion of a joint shaft that is part of an axle according to claim 1, wherein the covering portion has a funnel shape.

4. A protective structure for a joint portion of a joint shaft that is part of an axle according to claim 1, wherein the covering portion has a frusto-pyramidal shape.

5. A protective structure for a joint portion of a joint shaft that is part of an axle according to claim 1, wherein the knuckle member and the covering member are molded out of an aluminum alloy.

6. A protective structure for a joint portion of a joint shaft that is part of an axle according to claim 1, further comprising a rubber boot surrounding the joint portion, the rubber boot being surrounded by the covering portion.

7. A protective structure for a joint portion of a joint shaft that is part of an axle according to claim 1, wherein: the knuckle member comprises a strut support portion that supports a strut on an upper part of the knuckle member; a lower arm support portion that supports a lower arm on a lower part of the knuckle member; and a driven shaft support portion that supports a driven shaft of the joint shaft on a side part of the knuckle member; the strut support portion, the lower arm support portion and the driven shaft support portion being fixed with the covering portion.

8. A vehicle having the protective structure of claim 1.

* * * * *